May 26, 1936.   F. F. T. FLINT   2,041,916
FLUID PRESSURE MOTOR
Filed May 20, 1935   3 Sheets-Sheet 1
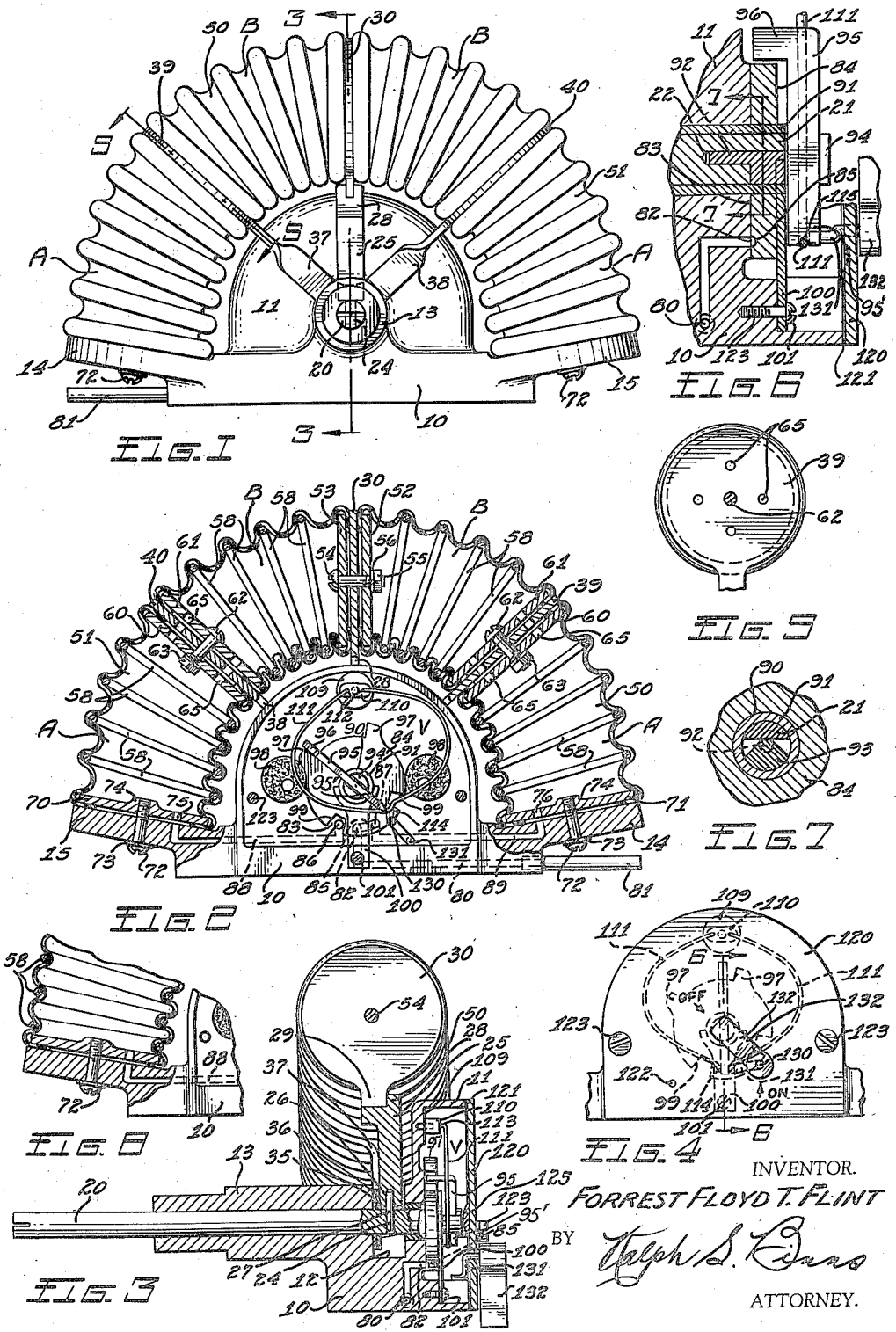
INVENTOR.
FORREST FLOYD T. FLINT
BY
ATTORNEY.

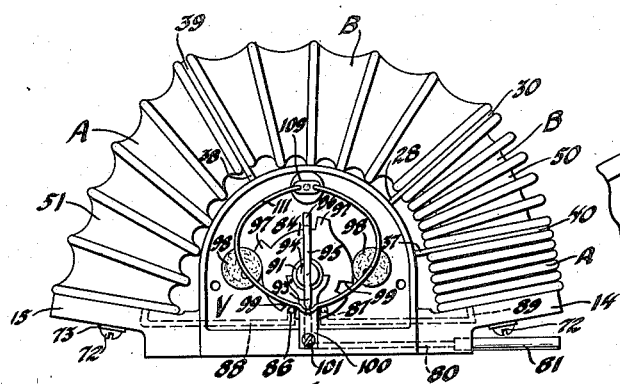

May 26, 1936. F. F. T. FLINT 2,041,916
FLUID PRESSURE MOTOR
Filed May 20, 1935 3 Sheets-Sheet 3

INVENTOR.
Forrest Floyd T. Flint
BY
ATTORNEY.

Patented May 26, 1936

2,041,916

UNITED STATES PATENT OFFICE 2,041,916

FLUID PRESSURE MOTOR

Forrest Floyd T. Flint, Detroit, Mich., assignor of one-half to Willard Ewart, Detroit, Mich.

Application May 20, 1935, Serial No. 22,456

3 Claims. (Cl. 121—48)

This invention relates to fluid pressure operated motors adapted for use particularly where the differential pressure is not great. The invention finds its greatest use in the field of the so-called "suction" type motor, operating on the differential pressure between that of the atmosphere and that of the lower pressure obtained by causing a partial vacuum.

Heretofore many types of fluid pressure actuated motors have been invented, and/or patented and/or used. In all of the foregoing types of motors it has been common to have some combination of the following devices: either a piston reciprocating in a cylinder or a stationary piston and a reciprocating cylinder and some means for translating reciprocatory motion into oscillatory motion; a flexible diaphragm in a rigid casing and motion translating means; a vane type piston oscillating in a rigid casing of arcuate outline; cylinders, each partially formed of a hollow, rigid, chamber-forming member and each partially formed of a collapsible bag having a guide member located therein, a walking beam connected to the ends of both bags, and motion translating means connected to said walking beam.

In all of these prior art devices there has been loss of power due to the motion translating means employed, or to the leakage of fluid around the piston, or to the friction, or to all of said causes and to other causes.

When such prior art motors are employed for actuating windshield cleaners and other devices where only small differential pressures are obtainable, such as that which may be derived by making fluid connection between any such fluid pressure motor and the intake manifold of an internal combustion engine, they do not employ such differential pressures to the best advantage, and frequently the friction of the wiper blade on the windshield glass is too great, at times when there is a variation in the amount of such differential pressures, and the motor therefore acts sluggishly or altogether stops.

The main object of this invention, therefore, is to provide a fluid pressure operated motor which is substantially frictionless in operation, is devoid of reciprocable parts sliding relative to one another, which is positive and powerful in operation, employs no motion translatory means, and which is provided with positive means for preventing leakage of the air or other fluid from one side of the actuating means to the other side thereof.

Another object of the invention is to provide a motor in which the working chambers are formed of collapsible tubes having a series of folds of larger and smaller diameter, that is, they have distortable walls that collapse and expand like an accordion, which collapsible tubes are utilized as part of the power applying means.

Another object of the invention is to provide positive means for preventing any portion of the bellows or tubes from remaining in a collapsed state.

Another object of the invention is to provide a means for preventing the valve control means from shifting when it is desired to have the exhaust continually connected to but one chamber so as to hold the motor shaft in either extreme end of its oscillating movement.

In the accompanying drawings I have illustrated the preferred embodiment of the invention, wherein the motor includes a pair of tubes, collapsible and expandible lengthwise, each tube being formed in two sections, as hereinafter described, the two tubes being joined together and adapted to operate as a bellows. This method of making long tubes has been found to be cheaper so far as procuring the rubber sections from a rubber manufacturer is concerned, and this method permits greater ease in assembling the other parts of the device, although the device works equally well when each tube is formed in but one section.

The invention and the foregoing advantages and many others not hereinbefore specifically pointed out may be better understood from the following description taken in connection with the accompanying drawings, wherein, Fig. 1 is a side elevational view of a fluid pressure motor embodying my invention.

Fig. 2 is a view in elevation of the side opposite that shown in Fig. 1, and being partially broken away, showing a sectional elevational view of the fluid pressure tube and an elevational view of the control mechanism with the cover plate removed.

Fig. 3 is a transverse sectional view taken on line 3—3 of Fig. 1.

Fig. 4 is a fractional view in elevation showing, in full lines, the outside of the cover plate for the control mechanism with the starting and stopping lever, and, in dotted lines, the control mechanism.

Fig. 5 is a transverse sectional view of one of the perforated discs taken on line 5—5 of Fig. 1.

Fig. 6 is an enlarged sectional view of the control mechanism shown in Fig. 3, taken on substantially the same line as Fig. 3, viz., 3—3 of Fig.

Figure 13:
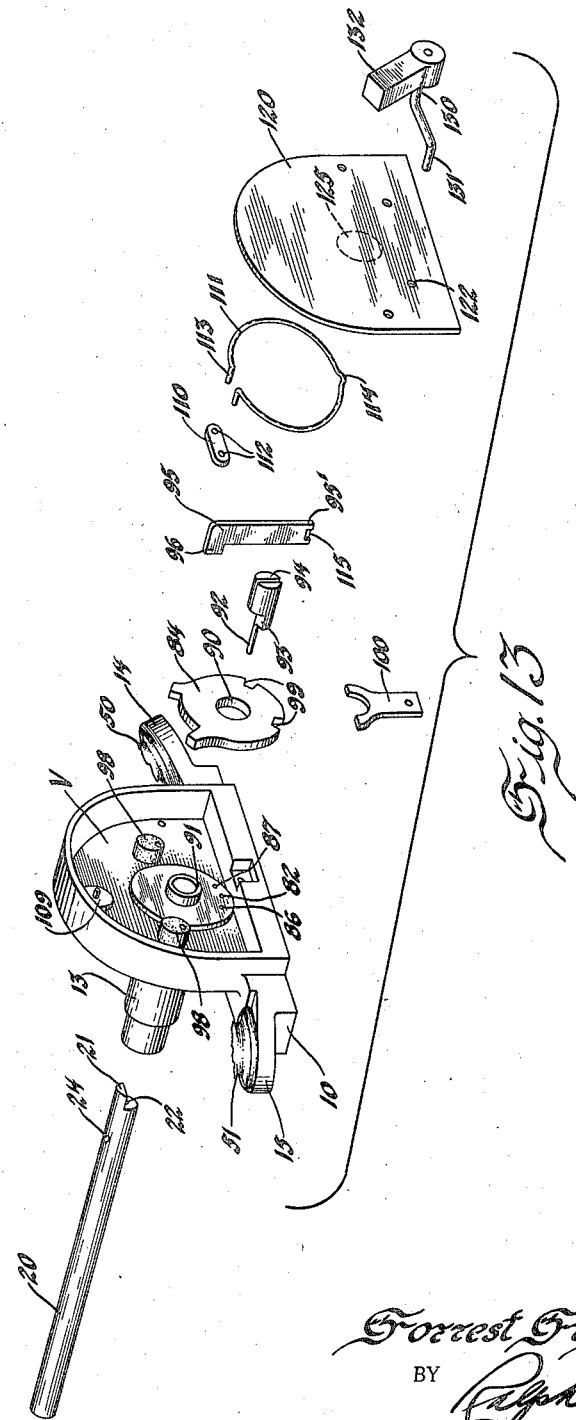

1, but showing some of the parts in a different position.

Fig. 7 is a detail view taken on line 7—7 of Fig. 6 showing a cross section of the motor shaft and a cross section of a portion of the pivot arm of the valve trip mechanism.

Fig. 8 is a fractional detail view showing a portion of the tubes provided with exterior supporting rings.

Fig. 9 is a view in elevation with the cover plate removed, showing bellows parts swung almost to their extreme right hand position and the valve kicker shown in position to kick the valve to its reverse position.

Fig. 10 is a view similar to that shown in Fig. 9, showing the bellows parts and valve mechanism in the opposite position.

Fig. 11 is a plan view of the spring support and spring for snapping the valve kicker over to shift the valve.

Fig. 12 is a section taken on line 12—12 of Fig. 11.

Fig. 13 is an exploded perspective view of the housing shaft and valve member.

The motor includes a casting, designated generally by the numeral 10, provided with a casing for a valve chamber, preferably formed by an integral upstanding shell or open end portion 11. The casting 10 is also provided with a reduced central portion 12 and an outwardly projecting bearing or shaft engaging portion 13. At the opposite ends, the casting is provided with extending portions 14 and 15 which serve as bases for the end walls of the collapsible tubes to be hereinafter described. The extending portions or bases 14 and 15 are preferably inclined outwardly and upwardly as shown.

The motor shaft 20 extends through the portion 13 of casting 10 and I have shown a reduced portion 21 projecting through the upstanding shell portion 11 of the casting 10 and through the valve to be hereinafter described.

In order to convey power to the shaft from the actuating means to be described hereinafter, I provide an arm 25 which may be secured to the shaft in any convenient manner. I have shown a partial bore or a recess 24 in the shaft and a partial bore or recess 26 in the adjacent end of arm 25 with a pin 27 engaged by the said arm and shaft in said partial bores or recesses. I have shown the upper end of arm 25 as provided with an enlarged grooved seat portion 28 which engages a downwardly projecting lug or ear 29 of a central disc member 30, although any suitable means of connecting the disc member to the arm may be used or the arm and disc may be integrally constructed.

Loosely mounted on the shaft 20 I provide two guide members for the combined tubes or bellows to be hereinafter described. I have shown two rings 35 and 36, respectively, loosely mounted on the shaft, each provided with an extending arm, designated 37 and 38 respectively, the ring and arm being preferably integral as shown. Each of these arms terminates in a perforated disc member, designated 39 and 40 respectively, each disc member and arm also being preferably integral as shown.

I provide a pair of collapsible tubes 50 and 51, having a series of folds of successive large diameter portions and smaller diameter portions. These tubes may be made of metal having considerable elastic qualities, or of rubber or the like, but when made of rubber they must be provided with supporting members as hereinafter described. I secure one end of each tube to the disc 30, and the opposite end of each tube I secure respectively to the extending portions 14 and 15 of casting 10 in any suitable manner.

Preferably each tube is formed in two sections A and B. To unite the sections A and B of each tube I provide two additional discs 60 and 61 in adjacent ends of said sections, folding the end portions of each section over one of said discs and securing the same to the disc of the respective guide arms so as to impinge the ends of the respective tube sections together between the guide arm disc and the disc of the respective sections to form a seal, using any suitable securing means, such as the bolt 62 and nut 63 shown in Fig. 2. The discs 39, 40, 60, and 61 are suitably perforated as at 65 to permit passage of air or other fluid from section A to section B, and vice versa, in each tube.

To unite the sections B of each tube together and to the disc 30, I prefer to use two additional discs 52 and 53, folding the respective end portions of the said sections over said respective discs 52 and 53 to form a seal in the manner above described and securing the three discs 30, 52, and 53 together by any suitable means such as by bolt 54, nut 55, and any suitable sealing means, such as the gaskets 56. No fluid is to pass through these discs 30, 52, and 53.

To unite the sections A of each tube to the portions 14 and 15 of casting 10, I provide in each tube one additional perforated disc, designated 70 and 71 respectively, folding the ends of the respective tubes over the respective discs 70 and 71 and securing the said discs to the members 14 and 15 to impinge the ends of the sections therebetween by any suitable means, such as by bolts 72, sealing members 73, and bosses 74 integral with the discs 70 and 71 respectively, as shown in Fig. 2.

The perforation in disc 70 serves as a dual service port 75 for inlet of fluid to and exhaust of fluid from the chamber thus formed in the tube 51 and the perforation in disc 71 serves as a dual service port 76 for inlet of fluid to and exhaust of fluid from the chamber thus formed in tube 50.

The casting 10 is provided with an exhaust passage 80. This exhaust passage 80 has a suitable connecting pipe 81, at one end, adapted for connection with any suitable suction creating means, and terminating at the other end in an exhaust port 82 located in the valve casing or shell portion 11 of casting 10.

The valve casing 11 is provided with a valve seat 83, comprising a flat portion of said casing surrounding the shaft 20. Mounted on the reduced portion 21 of shaft 20, in a manner hereinafter to be described, is a disc valve 84, said valve being provided with a port connecting groove or passage 85. The groove or passage 85 is adapted to register with port 82 at all times and to connect the same with either one of two chamber communicating ports 86 and 87, port 82 being interposed between ports 86 and 87. A fluid passage 88 connects port 86 with dual service port 75 of the working chamber enclosed by tube 51 and a fluid passage 89 connects port 87 with dual service port 76 of the working chamber enclosed by tube 50.

The valve 84 is provided with a central bore 90, see Fig. 7 and Fig. 13, through which a non-rotatable bearing member 91, mounted in upstanding shell portion 11 or valve seat 83, projects. Said bearing member 91 encircles one end of the shaft, the end of reduced portion 21 thereof being flush with the portion of the bearing member projecting through said valve.

The end of shaft 20 adjacent reduced portion 21, is provided with a partial bore or recess 22, and a valve shifter pivot pin 92 extends through the bearing 91 and into said bore or recess 22 and is freely mounted to permit oscillation therein. The portion of the valve shifter pin 92 beneath reduced portion 21 of shaft 20, which is surrounded by the bearing 91, is provided with a depending lug 93 of general triangular outline, in cross section, as shown in Fig. 7. This valve shifter pin lug permits partial oscillation of the shaft 20 in either direction before the lower face of reduced portion 21 of the shaft 20 will contact either of its faces, and further rotation of the shaft will move the lug, causing pin 92 to turn.

The portion of the valve shifter pivot pin 92 which projects into the valve chamber V is provided with an enlarged slotted head 94 in which is mounted a valve shifter lever 95, the latter having, on the upper end, an offset lug or valve kicker 96 which is adapted to contact spaced valve actuating shoulders 97 projecting from the upper portion of the disc valve 84.

Suitably mounted in the valve chamber V are cushioned valve stop members 98, one on each side of the disc valve 84, each stop member being adapted to contact its adjacent valve actuating member to stop the valve in the desired and proper shifted position.

The lower portion of the disc valve 84 is provided with two spaced recessed portions 99, so spaced that when the valve connects exhaust port 82 with port 87, port 86 will register with one of said recessed valve portions 99 and vice versa.

In order to hold valve 84 tightly against its seat 83, any suitable means may be employed. I prefer to use a yoke member 100 which I secure, as by a screw 101, to the lower portion of the valve casing 11 of the casting 10, and said yoke member projects upwardly between the valve 84 and the valve shifter lever 95 and partially surrounds the portion of bearing member 91 which extends through said valve.

Pivotally mounted in a suitable bearing member 109 in the upper portion of valve chamber V is a spring support 110 in which the ends of a spring 111 of general circular outline are mounted, the spring support having openings 112, one on each side of the pivot point, adapted to receive bent portions 113 of spring 111.

The mid portion of the spring 111 is bent into a V shaped portion as shown at 114 to form a seat for the lower arm 95' of valve shifter lever 95 which is preferably tapered to fit therein and which is also grooved at 115, see Fig. 6, to receive the spring seat and to aid in keeping the said lever arm and the spring seat together.

The said valve casing or shell portion 11 of casting 10 is provided with a cover plate 120 which cooperates therewith in forming valve chamber V. When the motor is used with pressures greater than that of atmosphere, a sealing gasket 121 of any suitable sealing material is provided between the periphery of said valve casing and the cover plate. Said cover plate is also provided with a pressure or atmospheric inlet port 122 and is secured to the valve casing by screws 123 or by any other suitable means. When the device operates as a so-called "suction" operated motor, the gasket 121 may be omitted and the port 122 may also be omitted if the cover plate is not sealed tightly enough to the valve casing to exclude the passage of air.

In order that the valve shifter pin 92 will not unduly move outwardly too far in the bore 22, I provide a bearing member 125 on the inner side of the cover plate 120 against which the enlarged head 94 of said pin is adapted to abut.

Pivotally mounted in the cover plate 120 is a crank lever 130 having a crank arm 131 adapted to be swung into and out of the path of the lower arm of valve shifter lever 95 by a handle 132 and the "on" and "off" positions for the handle are designated on the outside of the cover plate 120.

As is well known in the art, when bellows or tubes are made of rubber or the like, they must be provided with some form of supports of which many types are well known. These supports prevent the tubes from bulging unduly and aid in uniformly collapsing the tubes when used in so-called "positive pressure" devices and they prevent peripheral collapse of the tubes when used in so-called "suction pressure" devices. I prefer to use a series of rings 58, placing one in each large diameter portion of the folds of the rubber tubes, when the motor is to be used as a so-called "suction" motor, as shown in Fig. 2, and placing one in each of the small diameter external grooves or portions of the folds of the tubes when the motor is to be used as a so-called "positive pressure" motor, as shown in Figure 8.

Operation

As illustrated in Figs. 1 and 2, the motor is shown in the normal position that it assumes when not subjected to differential pressures in the respective working chambers.

When exhaust passage 81 is connected to a suitable source of suction or when pressure inlet port 122 is connected to a source of pressure greater than that of the atmosphere, the ports being assumed to be in the position shown in Fig. 2, the motor is ready for operation, and on moving handle 132 to the "on" position, the motor will oscillate the shaft 20.

The action is as follows: pressure will be exhausted from the working chamber in tube 50, (since exhaust port 82 is coupled to port 87 which communicates with tube 50 through passage 89 and dual service port 76,) and additional pressure will be applied in the working chamber enclosed in tube 51, (since port 86 is registering with a recess 99 of disc valve 84 and thus is open to receive pressure and communicates with chamber 51 through port 88 and dual service port 75) and this pressure differential causes tube 51 to elongate and tube 50 to collapse, thus swinging disc 30 and its connecting arm 25 which, in turn, rocks shaft 20 to the right as viewed in Figs. 2, 4, and 7.

As the shaft 20 rocks, the lower face of reduced portion 21 eventually contacts one face of lug 93 of the valve shifter pivot pin 92, see Fig. 7, and just before the end of its rocking to the right, it rocks said lug, causing the pivot pin 92 to rock, which in turn swings valve shifter lever 95, from the position shown in Fig. 2 beyond the perpendicular position (shown in Fig. 6 and in dotted lines in Fig. 4), the positive pressure of the shaft being greater than that of the spring. The spring then snaps over to the opposite position of that shown in Fig. 2 to the position shown in Fig. 10, carrying lever arm 95' of valve shifter lever 95 with it, and holds said lever in such opposite position till the reverse rocking motion of the shaft reverses the valve again in like manner.

As the spring snaps the valve shifter lever 95 from the position shown in Fig. 2, valve kicker lug 96 hits the right ear 97 of disc valve 84 and snaps it down against the right cushioned stop member 98, thus shifting the valve, whereupon the reverse action takes place.

Continuous exhaust

When the motor is used to actuate a windshield squeegee, it is desired to hold the shaft at one end of its stroke and thus hold the squeegee at one end of its stroke. To accomplish this handle 132 is turned to the "off" position, as shown in Fig. 4, and crank arm 131 will then be turned into the path of the valve trip mechanism, to the position shown, as shown in Fig. 6 and in dotted lines in Fig. 4. This permits the shaft to rock once in one direction or once in both directions, depending upon the direction the valve shifter lever 95 is moving when the handle is moved to the "off" position, before said crank arm engages the lower arm 95' of said valve shifter lever 95 and then prevents the valve from shifting. This results in continuously connecting the exhaust to but one working chamber and so effectively holds the shaft at one end of its rocking or oscillating stroke.

Having thus fully described my invention, I do not desire to be limited to the exact structure shown, as it is apparent to one skilled in the art that many changes may be made without departing from the scope of the appended claims.

I claim:

1. A fluid pressure motor of the character described including a casting presenting a pair of spaced surfaces, a pair of extensible and collapsible tubes each having one end secured to one of said spaced surfaces respectively and each tube having a closed moveable end, the moveable ends of said tubes being secured together and bent to form a substantially semi-circular structure of the two tubes, said surfaces and said connected tubes and closed ends co-operating in forming two working chambers, means including an automatically operated quick acting valve mechanism for alternately placing said working chambers respectively in communication with operating pressure, means for guiding portions of said tubes, causing the same to move substantially through an arc of a circle and means operable by the action of said tubes for taking off power from the motor.

2. A fluid pressure motor of the character described including a casting presenting a pair of spaced surfaces, a pair of extensible and collapsible tubes each having one end secured to one of said surfaces respectively and each tube having a closed moveable end, said moveable ends being secured together and the tubes being bent to form substantially a semi-circular structure, said closed ends and said surfaces and said tubes cooperating in forming two working chambers, means including an automatically operated quick acting valve mechanism for alternately placing said chambers respectively in communication with operating pressure, a power take-off shaft and means secured to the moveable ends of said tubes and to said shaft for guiding said tube ends and for oscillating said shaft.

3. A fluid pressure motor of the character described including a casting presenting a pair of spaced surfaces, a pair of collapsible and extensible tubes each having one end secured to one of said surfaces respectively and each tube having a closed moveable end, said surfaces and said closed moveable ends and said tubes cooperating in forming two working chambers, means including an automatically operated quick acting valve mechanism for alternately placing said chambers respectively in communication with operating pressure, the moveable ends of said tubes being secured together and the tubes bent to form a substantially semi-circular structure, a power take-off shaft, means secured to the moveable ends of said tubes and to said shaft for guiding said tube ends and for oscillating said shaft and means for guiding other portions of said tubes in their movement causing said parts substantially to move through an arc of a circle.

FORREST FLOYD T. FLINT.